United States Patent

Reichard et al.

[11] Patent Number: 5,923,145
[45] Date of Patent: Jul. 13, 1999

[54] CONTROLLER FOR VARIABLE SPEED MOTOR

[75] Inventors: Jeffrey A. Reichard, West Allis; Michael Lemcke, South Milwaukee, both of Wis.; Ali I. Uzumcu, Hoffman Estates, Ill.

[73] Assignee: S-B Power Tool Company, Chicago, Ill.

[21] Appl. No.: 08/911,687

[22] Filed: Aug. 15, 1997

[51] Int. Cl.⁶ .................................. H02P 5/17; H02P 5/28
[52] U.S. Cl. .......................... 318/811; 318/254; 388/804; 388/811
[58] Field of Search ............................ 318/807–811, 254, 318/439, 138, 503; 388/804, 811

[56] References Cited

U.S. PATENT DOCUMENTS

| | | | |
|---|---|---|---|
| 4,387,421 | 6/1983 | Zach et al. | 364/148 |
| 4,843,297 | 6/1989 | Landino et al. | 318/811 |
| 5,086,862 | 2/1992 | Graber et al. | 180/422 |
| 5,254,916 | 10/1993 | Hopkins | 318/443 |
| 5,447,414 | 9/1995 | Nordby et al. | 417/20 |
| 5,498,947 | 3/1996 | Wang et al. | 318/811 |
| 5,744,921 | 4/1998 | Makaran | 318/254 |
| 5,777,447 | 7/1998 | Okano | 318/434 |

FOREIGN PATENT DOCUMENTS

| | | |
|---|---|---|
| 2 093 288 | 8/1982 | United Kingdom . |
| 2 100 533 | 12/1982 | United Kingdom . |
| 2 156 546 | 10/1985 | United Kingdom . |
| 2 242 795 | 10/1991 | United Kingdom . |
| 2 258 094 | 1/1993 | United Kingdom . |

*Primary Examiner*—Brian Sircus
*Attorney, Agent, or Firm*—Greer, Burns & Crain, Ltd

[57] ABSTRACT

A controller controls the running speed of a variable speed motor of the type which runs at a speed related to the duty cycle of a pulse width modulated drive voltage applied to it and to the load being applied. The controller includes a setting switch for setting the motor running speed and a device for measuring the load being applied to the motor. Also included is a data storage for storing data representing a plurality of different pulse width modulation duty cycles for driving the motor at various desired motor running speeds and with various loads being applied to the motor. A processor is operatively connected to the setting switch, the load measuring device and the data storage for generating signals representing a particular duty cycle corresponding to a desired running speed setting and applied load to result in the desired motor speed. The processor generates these signals at a predetermined time interval to reach and maintain the desired motor speed. A voltage applying device is provided for applying the pulse width modulated voltage having the particular duty cycle to the motor.

19 Claims, 10 Drawing Sheets

CONTROLLER FOR VARIABLE SPEED MOTOR

The present invention generally relates to controllers for variable speed motors, and more particularly to controllers for controlling the running speed of variable speed motors of the type which run at a speed related to the duty cycle of a pulse width modulated (PWM) drive voltage applied to it and to the load being applied.

Variable speed motors that run at a speed related to the duty cycle of a PWM drive voltage are typically used in hand-held power tools. These motors are generally inexpensive so that the overall cost of the tools can be competitive. Consequently, these motors have poor torque response, especially at low speeds. While it is known to employ a tachometer feedback circuit to obtain the desired performance from these motors, this method is not practicable because it would require incurring additional cost which would be reflected in the cost of the tools.

Controllers not requiring a tachometer feedback circuit are known and are used primarily in controlling large industrial motors which have linear operating characteristics. However, these controllers are not adapted for controlling motors having non-linear operating characteristics which are displayed by the motors in power tools.

Accordingly, it is a primary object of the present invention to provide an improved motor controller for obtaining increased torque response from variable speed motors.

Another object is to provide an improved motor controller which is relatively inexpensive to produce.

Yet another object is to provide an improved motor controller which is adapted to effectively control motors which are placed under rapidly varying load conditions.

Other objects and advantages will become apparent upon reading the following detailed description, while referring to the attached drawings, in which:

DETAILED DESCRIPTION

The present invention is directed to a controller for controlling the running speed of a motor of the type generally used in power tools. The controller includes, among other things, a processor which determines from a data storage and at a predetermine time interval, appropriate pulse width modulation (PWM) duty cycles for controlling the running speed of the motor. Signals corresponding to the PWM duty cycles are input to a circuit that produces a pulse width modulated voltage which is applied to the motor to obtain and maintain the desired motor speed.

Broadly stated, the present invention is directed to a controller for controlling the running speed of a variable speed motor of the type which runs at a speed related to the duty cycle of a pulse width modulated drive voltage applied to it and to the load being applied. The controller includes a setting switch for setting the motor running speed and a device for measuring the current being applied to the motor. Also included is a data storage for storing data representing a plurality of different pulse width modulation duty cycles for driving the motor at various desired motor running speeds and with various loads being applied to the motor. A processor is operatively connected to the setting switch, the current measuring device and the data storage for generating signals representing a particular duty cycle corresponding to a desired running speed setting and applied load to result in the desired motor speed. The processor generates these signals at a predetermined time interval to reach and maintain the desired motor speed. A voltage applying device is provided for applying the pulse width modulated voltage having the particular duty cycle to the motor.

A novel feature of the present invention is that data representing the PWM duty cycles necessary for operating the motor at the desired running speeds and applied loads are stored in the data storage. As such, the PWM duty cycles are immediately accessible without the need to perform extensive algebraic calculations. This allows the processor to obtain the PWM duty cycles very quickly, and thereby providing a more responsive and stable motor voltage compensation required to maintain speed control over a wide and rapidly varying load conditions.

Figure 1:
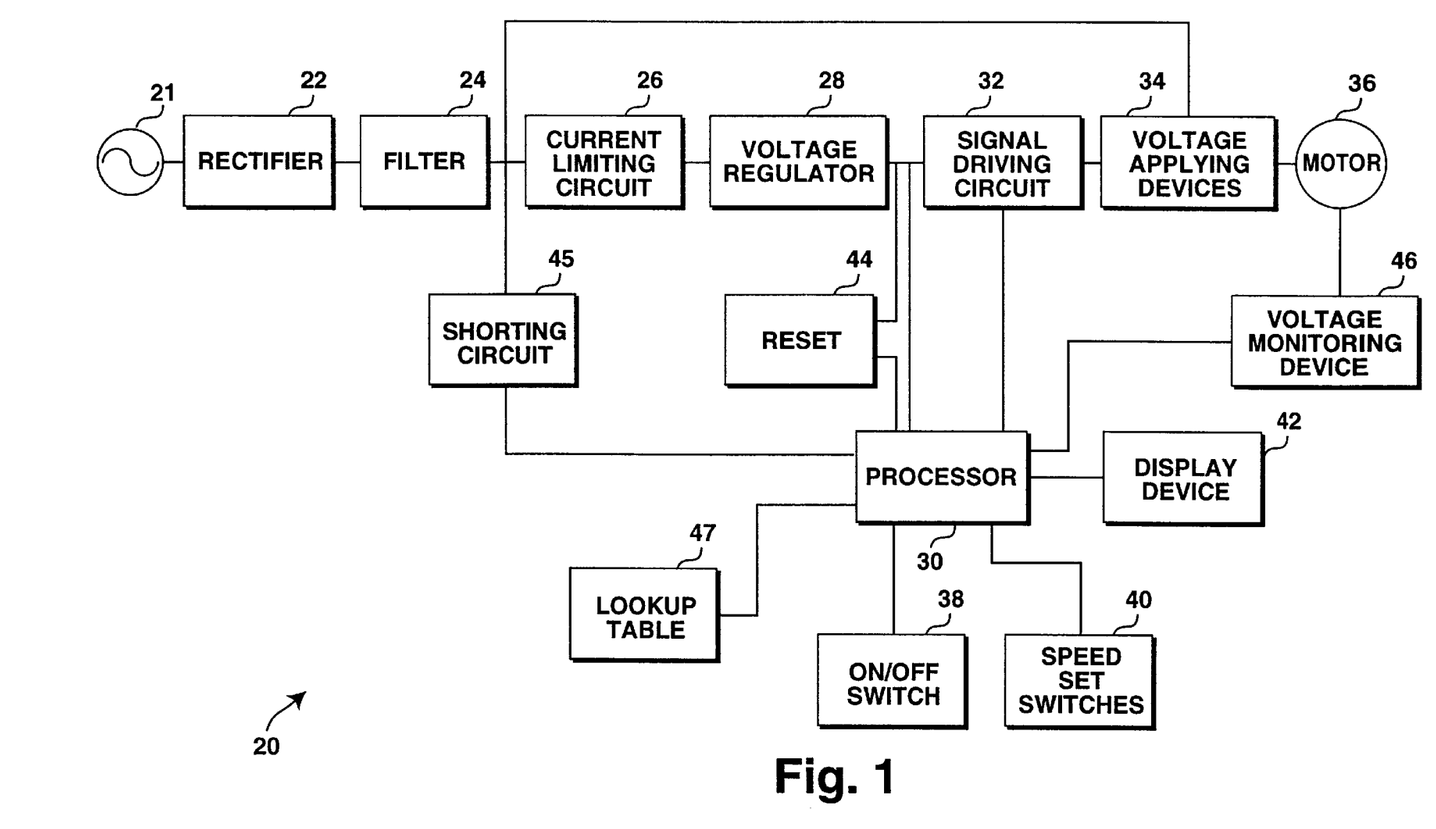
FIG. 1 is a block diagram generally depicting one embodiment of the present invention.

Turning now to the drawings, and particularly FIG. 1, there is shown a block diagram of one embodiment of a motor controller, indicated generally at 20, in accordance with the present invention. The basic configuration of this system includes a rectifier 22 which converts ac input voltage 21 to dc operating or system voltage. The rectified voltage is supplied to a filter 24 which removes any high frequency pulses. A current limiting circuit 26 is connected downstream of the filter 24 to limit the high current from the input voltage source, the output of which limiting circuit is then supplied to a voltage regulator 28 for regulating voltages supplied to a processor 30 and to a signal drive circuit 32. Operatively connected to the processor 30, the signal drive circuit 32 receives pulse width modulation signals generated by the processor 30, and drives these signals to a voltage applying device 34. A pulse width modulated voltage corresponding to the signals received from the signal drive circuit 32 is then applied to a motor 36 by the applying device 34.

Also connected to the processor 30 is an ON/OFF control switch 38 for turning the processor on or off, and a set switch 40 for entering the desired speed of the motor 36. The processor 30 further has a display device 42 connected thereto for displaying messages to an operator. In addition, a reset circuit 44 is connected between the voltage regulator 28 and the processor 30 for resetting the system. A power shorting circuit 45 is provided and connected between a point upstream of the current limiting circuit 26 and the processor 30, and shorts the controller 20 when a voltage monitoring device 46 indicates that a motor run away condition has occurred.

An important feature of the present invention, and connected to the processor 30, is a data storage 47 which contains data that defines a look-up table. The data storage 47 stores pulse width modulation duty cycles corresponding to motor running speeds set by the set switch 40 for a range of given loads placed on the motor 36.

Figure 2:
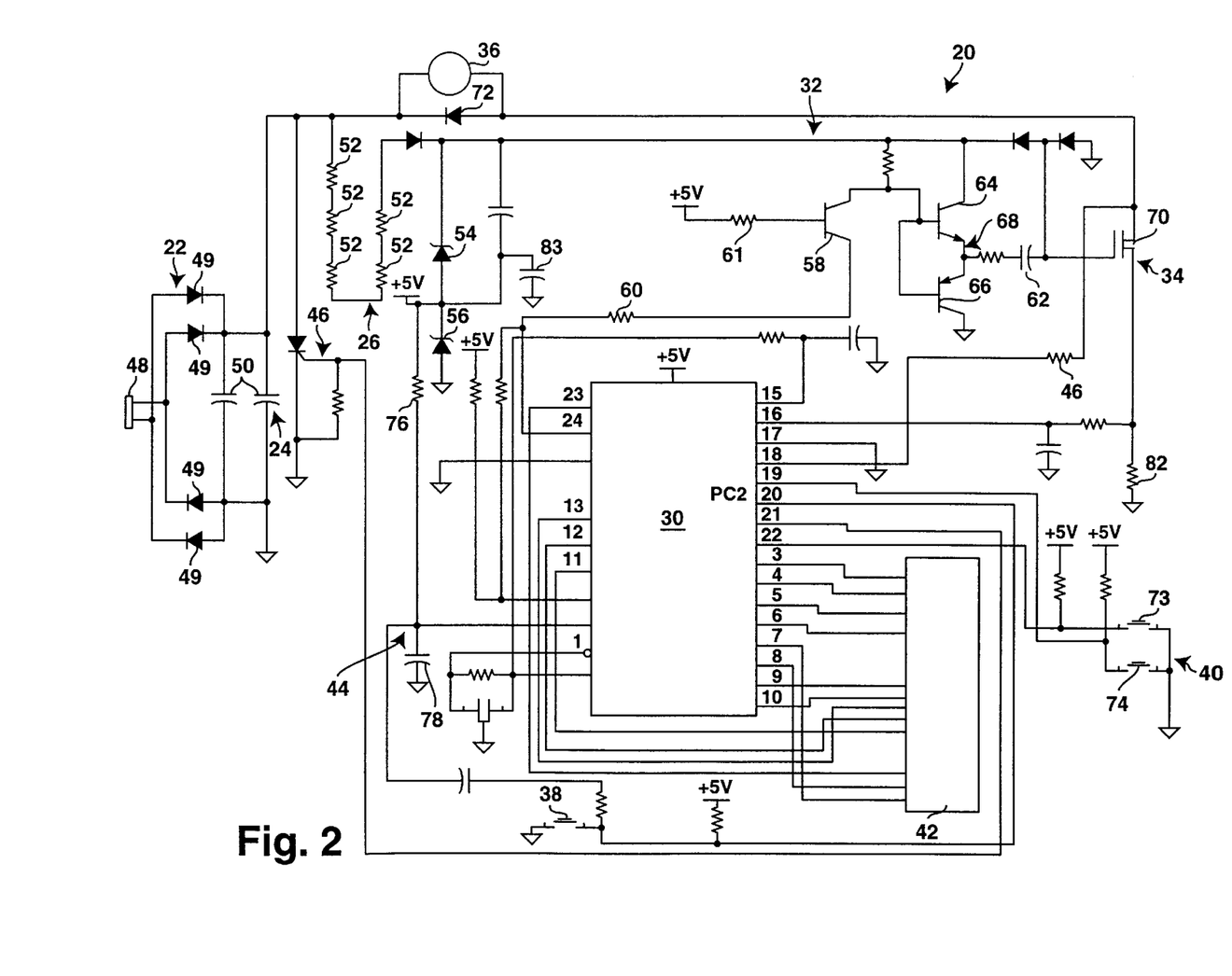
FIG. 2 is an electrical schematic diagram depicting one embodiment of the present invention.

Turning now to FIG. 2, the motor controller 20 is shown in electrical schematic circuit diagram. Electrically connected to the input junction 48, the rectifier 22 includes 4 diodes 49 which perform a full or half wave rectification of an input ac voltage. It should be noted that the ac to dc rectification may be done in any commonly known manner familiar to those skilled in the art, provided that full-wave rectification is accomplished. Downstream of the rectifier 22, the rectified dc voltage is filtered by filter 24 to remove any high frequency pulses which may over voltage the voltage applying device 34. While capacitors 50 are employed in the present invention as the filter elements, those of ordinary skill in the art will recognize that other filter arrangements may be utilized which perform the similar function.

The filtered current is then supplied to the motor 36 via the voltage applying devices 34 and to the current limiting circuit 26 which includes five series connected resistors 52. The current limiting circuit 26 limits the current from the rectified input voltage to a level sufficiently low enough to be supplied to the voltage regulator 28. Included in the regulator 28 are two zener diodes 54, 56 which provide approximately 10 V necessary to operate the voltage applying device 34 and 5 V required to operate the processor 30, respectively.

Referring now to the signal driver circuit 32, it includes a transistor 58, preferably a 2N3906 transistor, ac coupled via resistors 60, 61 and a capacitor 62 to a 5 V signal output from pin 24 of the processor 30. Connected to the output of the transistor 58, transistors 64, 66 form an amplifier 68 that boosts the level of current provided from the transistor 58 so that the voltage applying device 34, which is connected to the output of the amplifier 68, can be driven properly.

The ac coupling feature is adapted to prevent the motor from running out of control by automatically shutting off the motor 36 in the event the processor 30 were to fail, and thereby cause the voltage applying device 34 to be left in the on state. In such a situation, the voltage applying device 34 would only stay on for approximately 3 to 5 milliseconds before the current through capacitor 62 would fall to a level too low to drive the applying device 34. In normal operation, the processor 30 outputs a pulse to reset the capacitor 62 so that the motor 36 is not shut off unintentionally.

Referring now to the voltage applying device 34, it includes a field-effect transistor (FET) 70 connected to the output of the amplifier 68. A diode 72 is connected between the FET 70 and the output of the filter 24, and provides a dc clamping for the FET 70 when the FET is turned off by the signal drive circuit 32. The diode 72 also provides a path for the motor current to continue flowing after the FET 70 turns off.

In operation, the FET 70 is turned on to apply voltage to the motor 36, which increases the motor current. The FET 70 is then turned off causing the motor current to flow through the diode 72, which decreases the motor current. The FET 70 is turned on and off at a rate of about 2,000 times per second at a predetermined duty cycle as determined by the processor 30. This duty cycle multiplied by the input voltage determines the average applied voltage to the motor 36. As the average voltage to the motor 36 increases, the output speed of the motor also increases at any given load.

In the preferred embodiment, the processor 30 is a Motorola 68HC05P9 microprocessor. One of ordinary skill in the art will recognize that other microprocessors may be employed which perform similar functions. Connected respectively to pins 22 and 19 of the processor 30, the speed set switch 40 includes an increment switch 73 and a decrement switch 74. The reset circuit 44 includes a resistor 76 and a capacitor 78 and applies a reset voltage to pin 1 of the processor 30 each time the processor is powered up.

The ON/OFF control switch 38 is connected to pin 20 of the processor 30 and also to the input for the reset circuit 44, pin 1. Advantageously, this arrangement allows the processor to distinguish between an operator initiated ON/OFF sequence via the activation of the ON/OFF control switch 38 and resets which occur upon power up or after a malfunction in the processor 30. To determine whether the ON/OFF control switch 38 was activated, the processor 30 checks the state of port PC2 or pin 20 for a logic 0 state as it comes out of a reset condition after being turned off. If PC2 is low, then the reset was caused by the operator and the processor 30 performs its on/off sequence, i.e., either turning on or off depending on the state of the control switch 38. If, however, the PC2 is at logic 1 or high state, then this reset was not caused by the activation of the ON/OFF control switch 38 and the processor 30 goes into an OFF condition until a reset is initiated by the ON/OFF control switch.

Pin 21 of the processor 30 is connected to the power shorting circuit 46, which preferably is a semiconductor controlled rectifier (SCR), and Pin 18 is connected to the voltage monitoring device 46, which is a resistor. The shorting circuit 45 protects against a motor run away, i.e, where the motor 36 cannot be turned off as a result of the FET 70 being shorted in the on position, for example. In operation, the processor 30 reads the voltage across the voltage monitoring device 46 to determine the voltage across FET 70 after turning off the FET 70 for a predetermined time of about 500 to 600 milliseconds before going into a STOP or low power mode. If during this time, the FET voltage is relatively low, and thereby indicating that the FET 70 did not turn off, the processor 30 outputs a pulse on pin 21 that turns on the SCR in the shorting circuit 45, which shorts the rectified dc power source, thus stopping the motor 36.

The display device 42 in the preferred embodiment is a LCD display, but other display devices may be used. Connected to pins 3–10, 11–13 and 23 of the processor 30, the display device 42 receives signals from the processor indicating the speed of the motor 36, and displays the motor speed setting in revolutions per minute (RPM).

In accordance with one of the main features of the invention, the data storage 47 stores PWM duty cycles required to run the motor 36 at a given speed and load conditions. The data storage is provided within the processor 30 (not shown) and is represented basically as a three dimensional look-up table corresponding to a particular voltage rating of the motor 36. The look-up table provides the PWM duty cycle via a simple form of fuzzy logic based on the operator requested speed and the load of the motor as indicated by the motor current. The motor current is measured across a resistor 82 and is input to pin 16 of the processor 30.

In accordance with another aspect of the invention, the processor 30 also retains the last speed setting for the motor 36 for a predetermined time when the ac input power is disconnected. The power required for maintaining the speed setting is supplied from a capacitor 83 which is connected to the zener dide 54 and therefore, the predetermined time is a function of the capacitor, which is approximately 15 minutes in the present invention.

In a further aspect of the present invention, the processor 30 includes a feature for protecting the motor against overheating. The processor 30 estimates the motor temperature by using the motor current measured across the resistor 82 and the operating RPM and reduce the pulse width modulated voltages to the motor 36 before the motor overheats. In the event the motor 36 actually reaches the overheat temperature, the processor 30 automatically shuts off the motor.

Figure 3:
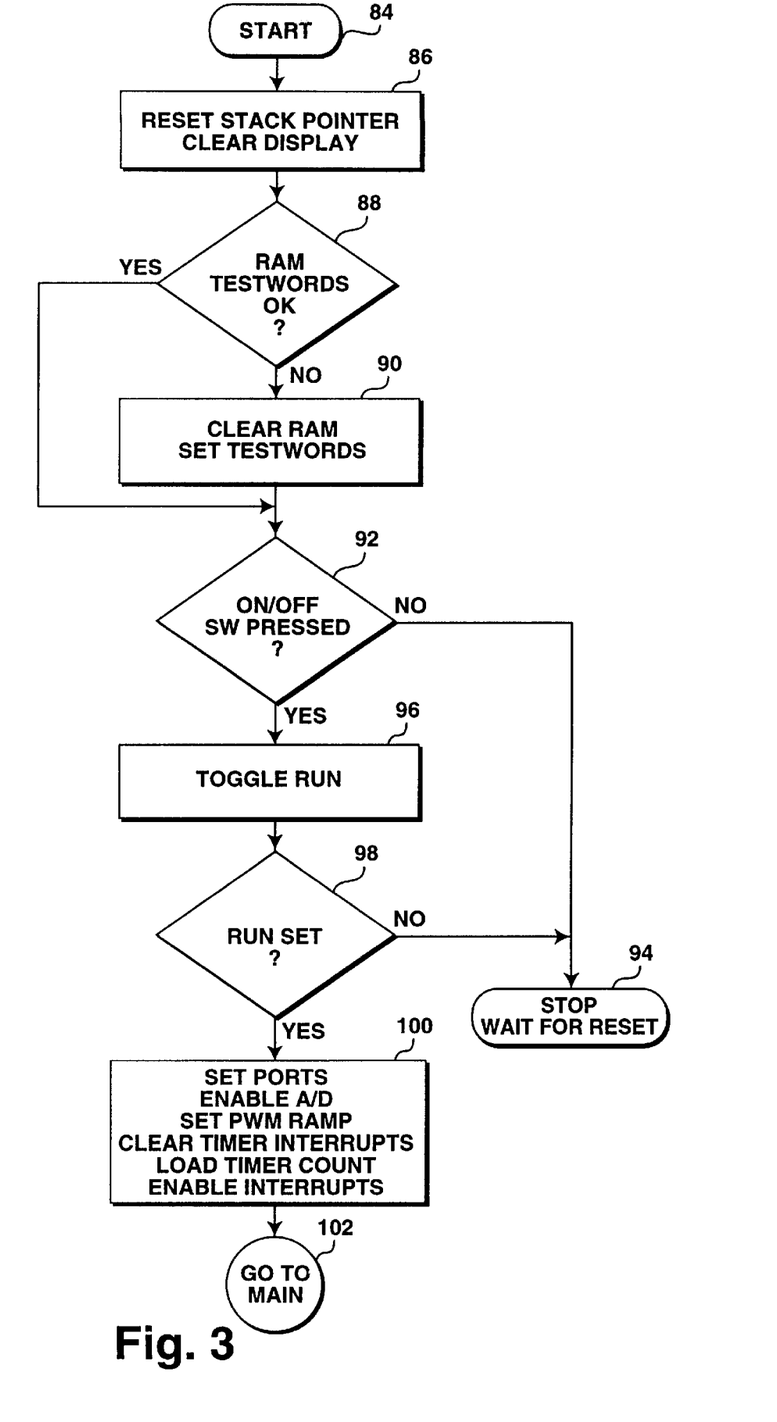
FIGS. 3–10 comprise flowcharts describing the operation of the present invention.

Now turning to FIGS. 3–10, a detailed description of the operation of the invention, and particularly the processor 30, will be made while referring to the flow charts depicted in these FIGURES. Turning initially to FIG. 3, when the controller 20 is connected to the ac input 21, the processor 30 is placed in a start stage (block 84). The processor 30 is also brought to this start stage after the processor 30 experiences a malfunction in its system, which is referred to as a computer operational (COP) reset. The ability to detect a malfunction and perform the COP reset is an inherent characteristics of processors such as Motorola 68HC05P9 microprocessor, which is preferred in the present invention.

Regardless of how the processor 30 is brought to the start stage (block 84), the stack pointer in the RAM, which contains subroutines, interrupts and their return addresses and data, is reset and the display device 42 is cleared (block 86). Then the processor 30 determines whether RAM test words are intact (block 88). The processor 30 is connected to the capacitor 83, which keeps a charge for a predetermined time after the ac input voltage is removed to retain the last speed setting of the motor 36. The condition of the test words correspondingly indicates the condition of the last speed setting recorded in the processor memory. If the processor 30 determines that test words have degraded to an unacceptable level, the RAM is cleared and the test words are reset (block 90). Conversely, if the test words have been retained, the procedure of block 90 is skipped.

Next a determination is made as to whether the ON/OFF switch 38 has been activated (block 92). If it has not, it is known that the processor 30 has been reset due to the power up process or due to the COP process, and the processor shuts itself off until the ON/OFF control switch 38 resets the processor (block 94). The processor 30 may also be reset by power up and COP procedure as described above.

If it is determined that the ON/OFF control switch 38 has been activated, it is known that the reset was initiated by the operator to begin the ON/OFF sequence. At this time, the processor 30 is toggled to operation condition (block 96), and a determination is made as to whether the ON/OFF switch 38 has been set to run (block 98). If it has not, then the processor 30 shuts itself off and waits for another reset (block 94). If the switch 38 is set to run, the processor 30 begins a series of initialization processes which includes setting the ports, enabling A/D, setting PWM ramp time, clearing timer interrupts, loading timer count and enabling interrupts (block 100). PWM ramp is the time period for gradually increasing the motor speed to the desired speed setting to avoid abrupt high speed operation of the motor 36.

Figure 4:
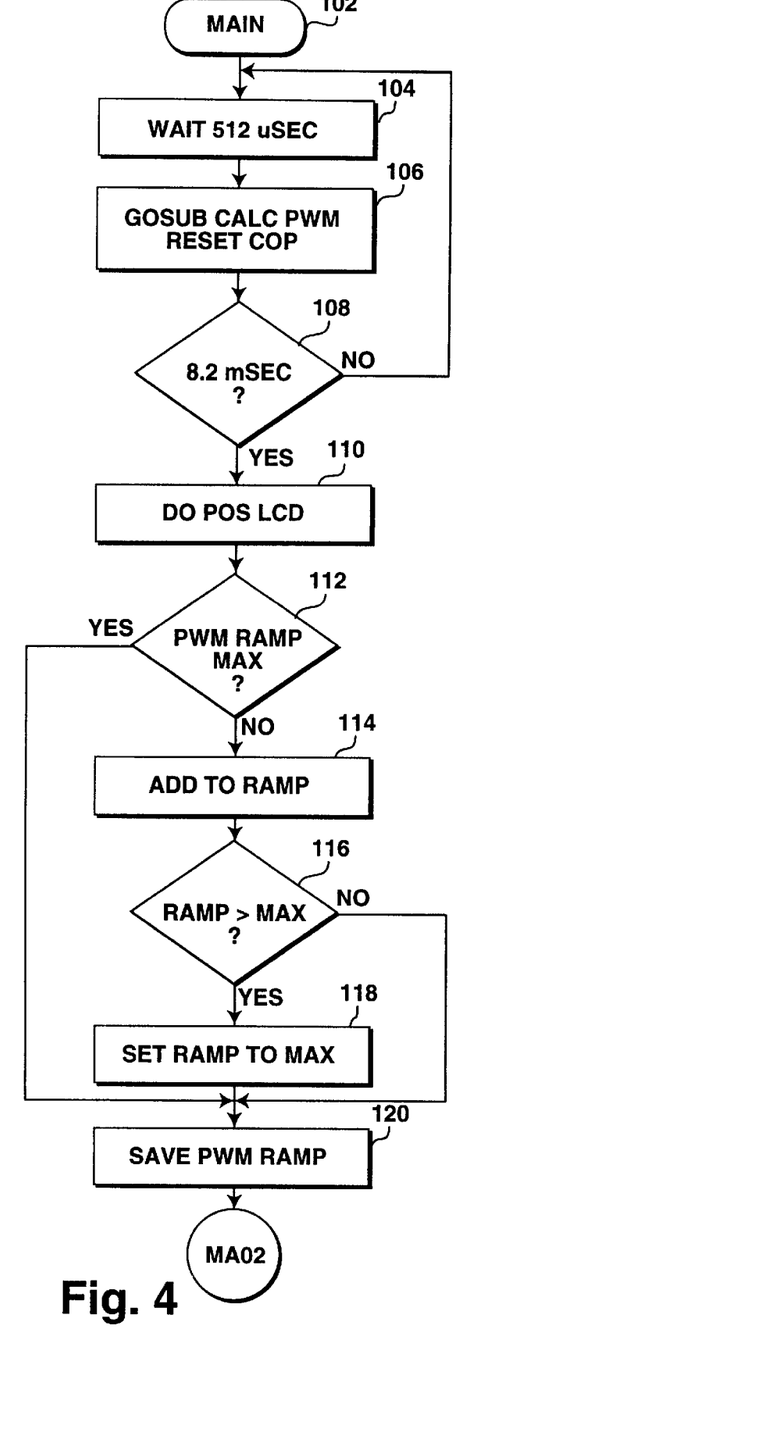

Turning now to FIG. 4, upon completion of the initialization processes described in block 100, the processor 30 goes into the main program (block 102), and waits approximately 512 microseconds for a pulse (block 104), at which time the next pulse width is calculated and the COP register is reset (block 106). Resetting the COP register prevents the COP reset described in blocks 84–90 from occurring. These steps are repeated for 8.2 msec (block 108).

After 8.2 msec has elapsed, a positive LCD display service is performed on the display device 42 to cause the display to go black, i.e., a positive write to the display is conducted (block 110). Then, it is determined whether the PWM ramp time is at its maximum (block 11). If it is not, the ramp time is increased (block 114), and thereafter a check is made to see if the ramp time has exceeded the maximum (block 116). If it has not, the ramp time is saved (block 120), but if it has, the ramp time is set to equal the maximum (block 118) and then saved (block 120). If at block 112, the PWM ramp is initially at its maximum, it is saved (block 120) without any adjustments. The increase in the running speed of the motor 36 is limited to the rate of increase dictated by the PWM ramp so that motor 36 has a "soft start." Once the PWM ramp time reaches the maximum, the increase and decrease rate of the motor running speed is not limited by the PWM ramp.

Figure 5:
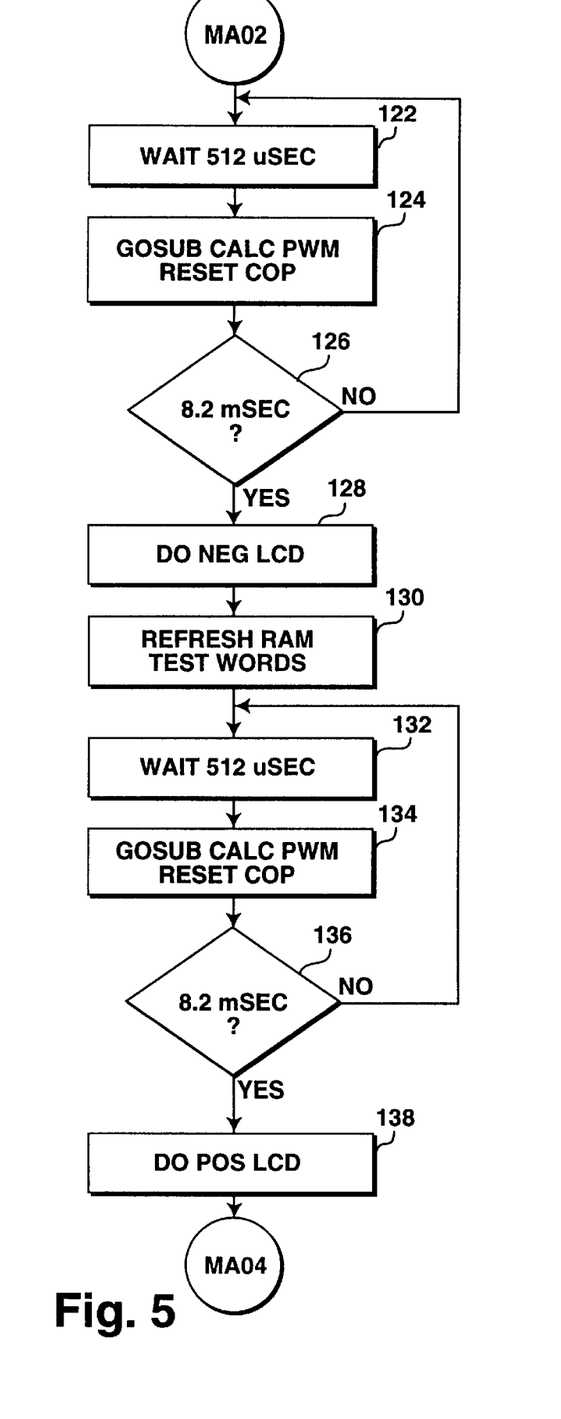

Turning now to FIG. 5, upon completion of the process in block 120, the processes described in blocks 104–108 are repeated (blocks 122–126, respectively) after which a negative LCD display service is performed on the display device 42 (block 128) to keep the display device operational. Then the RAM test words are refreshed in case noise in the system has altered the test words (block 130). Next, the processes in blocks 104–108 are again repeated (blocks 132–136, respectively) and another positive LCD display service is performed on the display device 42 (block 138).

Figure 6:
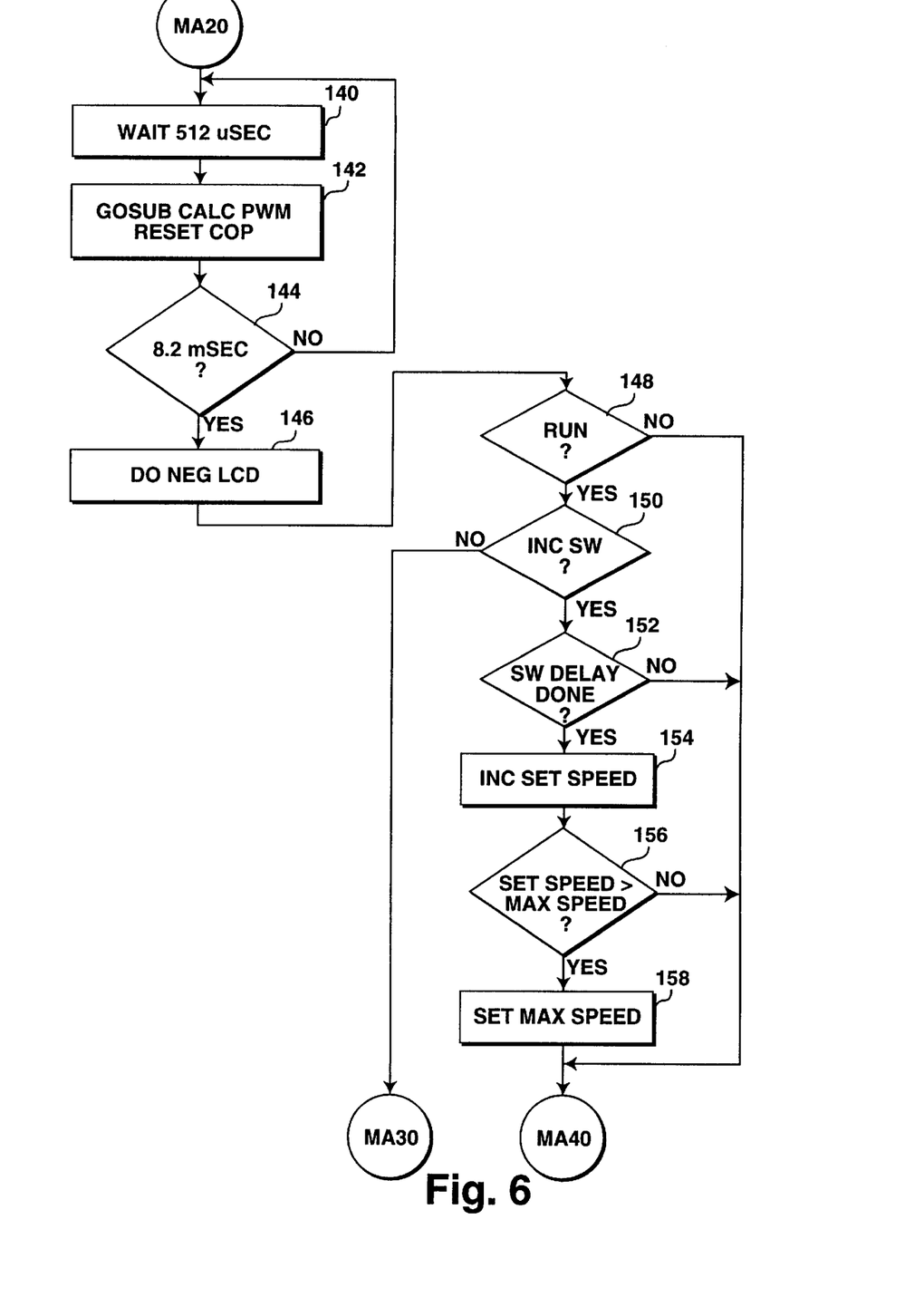

Turning now to FIG. 6, the processes described in blocks 104–108 are repeated (blocks 140–144, respectively), and another negative LCD service is performed (block 146). At this point, a check is made of the operational state of the processor 30 (block 148). If the processor 30 is in the run state, then it is determined whether the increment switch 73 is activated (block 150). If it is activated, then after a switch delay to prevent debounce (block 152), the set speed is incremented (block 154) and a check is made as to whether the set speed is greater than the maximum speed capable of running by the motor 36 (block 156). If it is greater, the set speed is reduced and set to the maximum speed (block 158). Otherwise, the speed is left at the incremented set speed.

Figure 7:
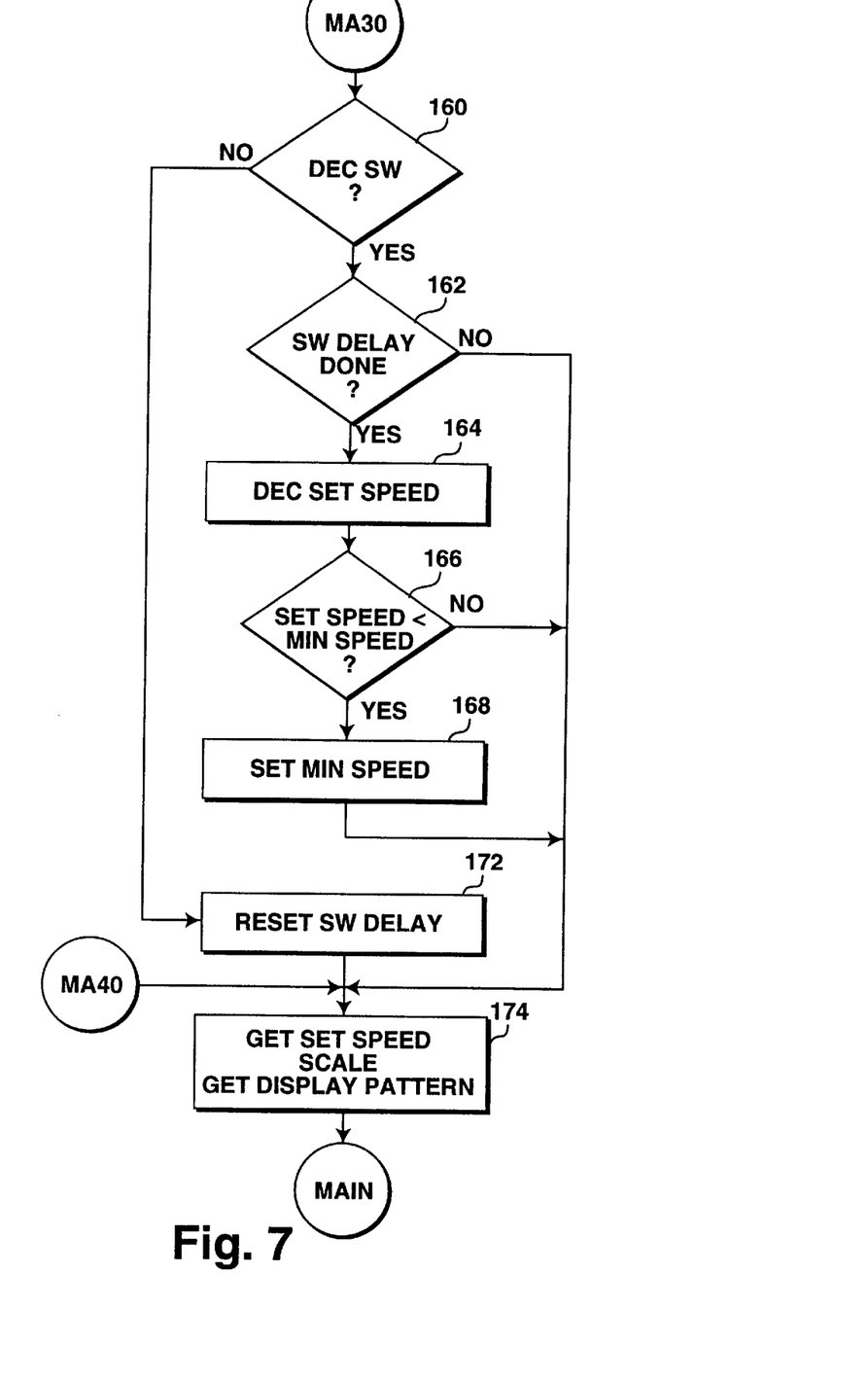

Turning now to FIG. 7, if the increment switch 73 is not activated, then a check is made to determine whether the decrement switch 74 is activated (block 160). If it is, then after a switch delay (block 162), the set speed is decremented (block 164). If upon determination that the decremented set speed is lower than the minimum speed the motor 36 is capable of running without stalling (block 166), the decremented set speed is reset to the minimum speed (block 168).

Referring back to block 160, if the decrement switch 74 is not activated the switch delay is reset (block 172), which requires presetting the delay counter related to the debounce. In all of the above-described processes described in blocks 148–172, whether directly or indirectly, their respective tasks are completed at block 174 where the set speed is obtained, scaled and displayed on the display device 42 corresponding to the display pattern representing the set speed.

Figure 8:
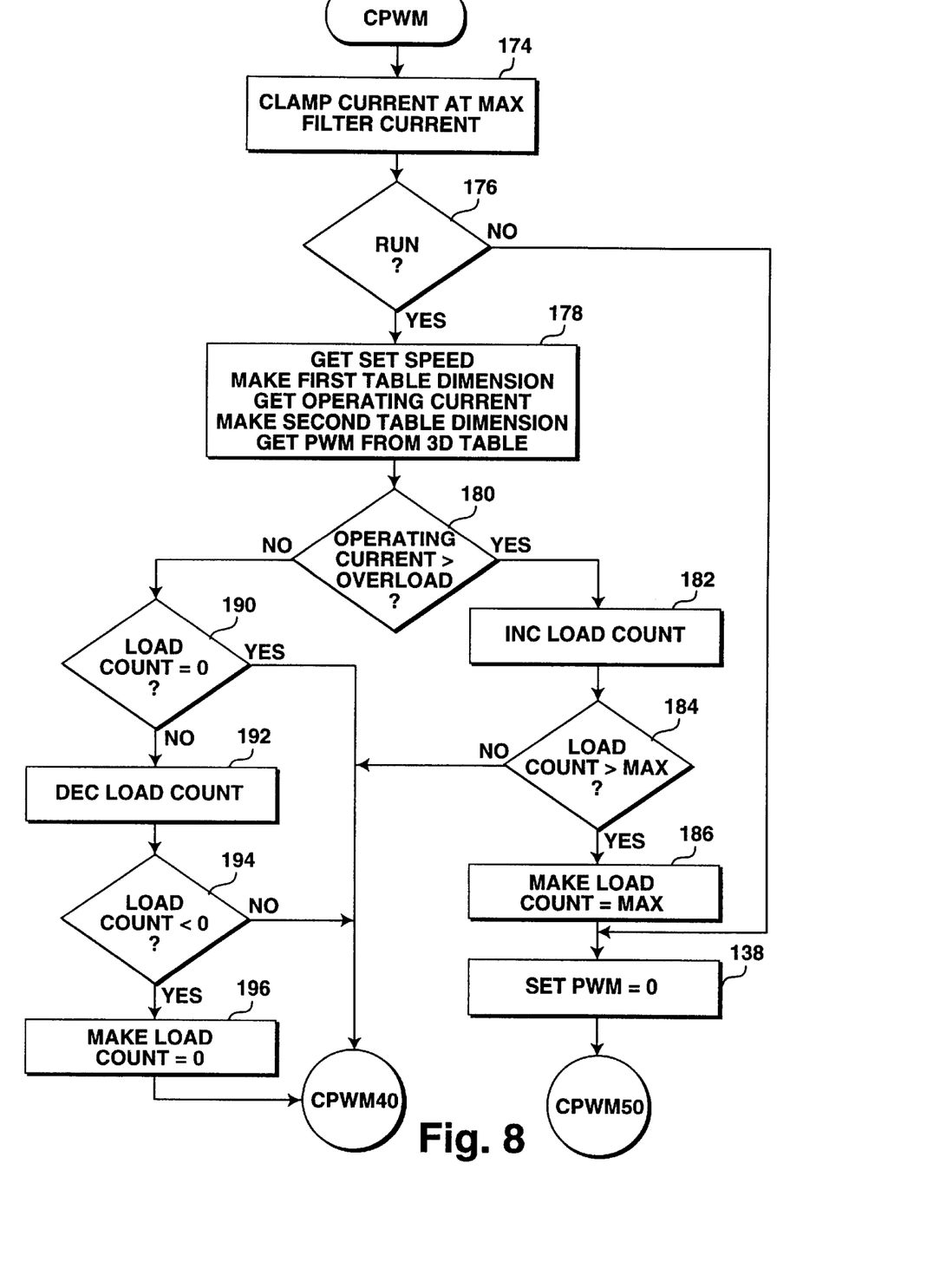
Figure 9:
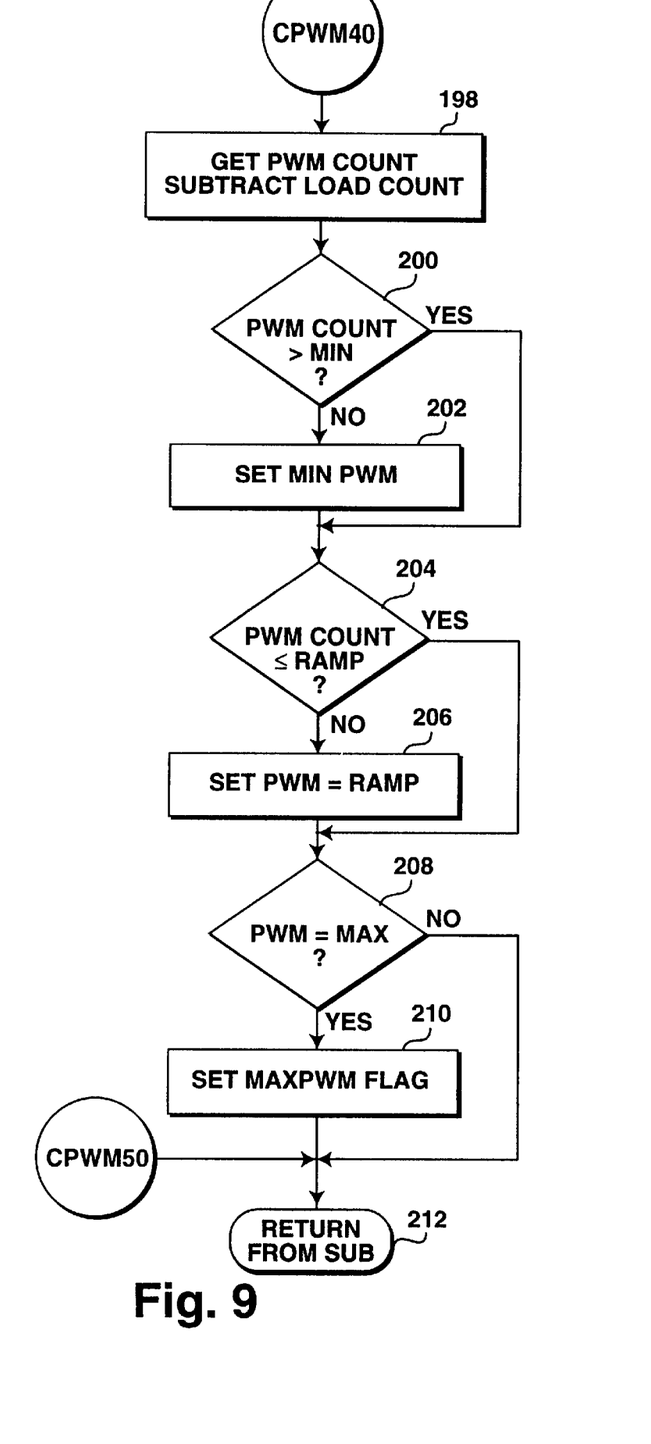

Turning now to FIGS. 8 and 9, the subroutine required in blocks 106, 124, 134 and 142 for calculating the PWM is described. As shown in FIG. 8, the subroutine begins by reading the operating current flowing through the motor 36 at the time the pulse is being output by the FET 70 and clamping this current to the maximum level (block 174). The current is also filtered by a time delay filter at this time to remove any spikes or noise (block 174). A check is made to determine whether the system is in the run condition (block 176). If it is, the set speed and the operating current is obtained, and based on these variables, the PWM is determined from the three dimensional look-up table (block 178).

Once the PWM is ascertained, it is adjusted to prevent the motor from overheating. As such, the operating current level is checked to determine whether it is greater than the overload level (block 180). If greater, a load count is incremented (block 182), and in the next step, a check is made to see if the load count has exceeded the maximum count (block 184). If it has, the load count is adjusted to make it equal the maximum count (block 186), the PWM is set to zero (block 188) and the subroutine returns to the main program (block 212).

If, however, the operating current has not exceeded the overload condition, a check is made to see if the load count is equal to zero (block 190). If it is not, the load count is decremented (block 192), and if it is determined subsequently that the load count is less than zero (block 194), the load count is reset to equal zero (block 196).

In the above-described processes, if the outcome of the determinations made in the processes of blocks 184, 190 and 194 are opposite the outcome provided above, the routine directly goes to block 198 after each determination. At block 198, which is shown in FIG. 9, the overload count obtained as a result of the processes in blocks 180–196 is subtracted from the PWM count obtained from the look-up table 47. The resulting PWM count is then checked to determine if it is greater than the minimum (block 200). If the PWM count is not greater, then PWM count is set to the minimum PWM (block 202). If it is greater, this process is skipped. In this manner, the motor 36 is prevented from stalling as a result of the PWM count being too low.

It is determined then as to whether PWM count is less than or equal to the RAMP (block 204). If the PWM count is not less than or equal, then the PWM is set to equal the RAMP. If not, this process is skipped. Then it is determined as to whether the PWM is equal to the maximum (block 208). If it is not, the subroutine goes back to the main program (block 212), but if it is, a maximum PWM flag is set (block 210) before the program goes back into the main program (block 212).

Figure 10:
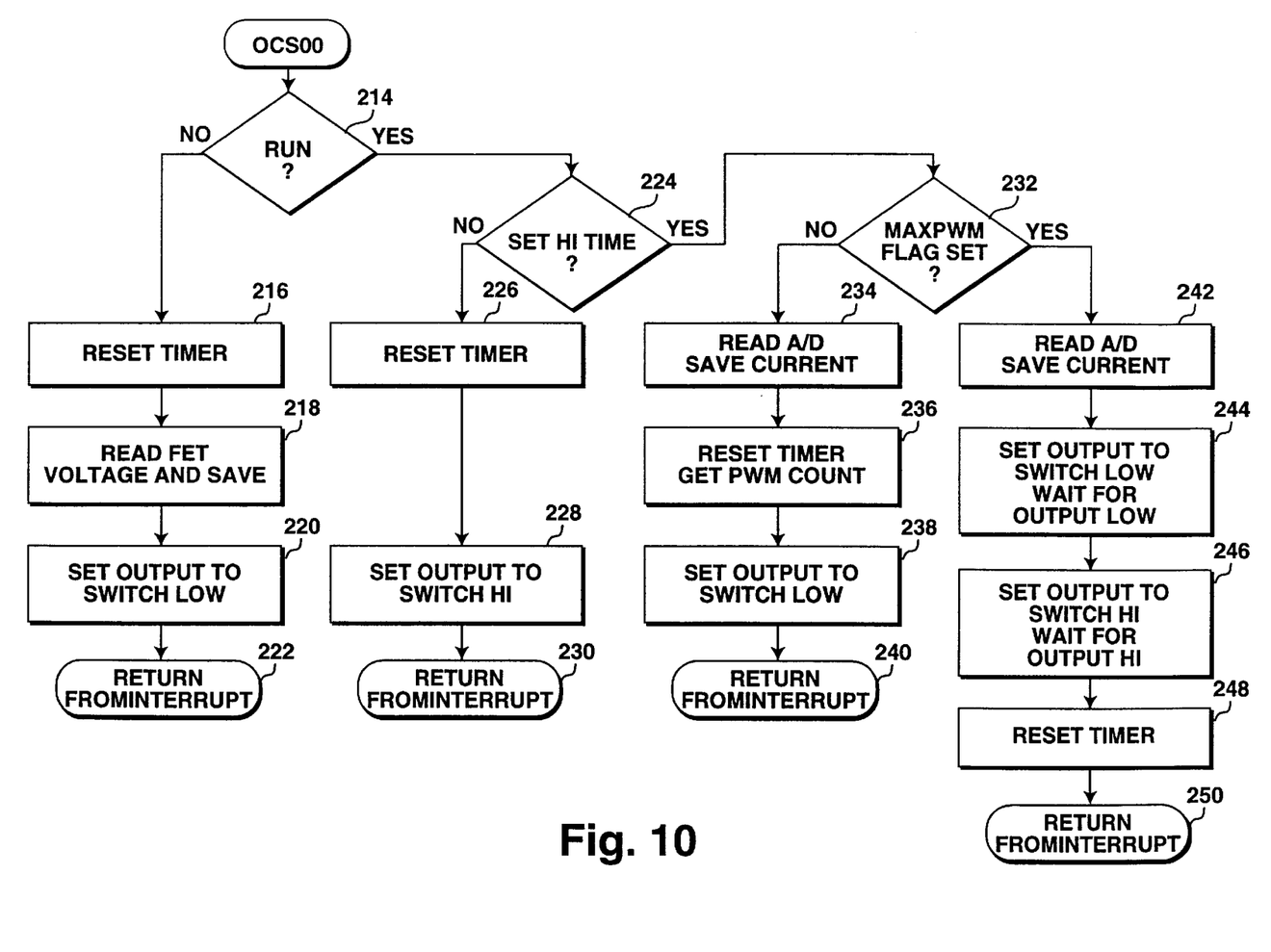

Turning now to FIG. 10, a flowchart is shown illustrating the interrupt routines which are used in generating the PWM output for driving the motor 36, which interrupt routines are a function of the processor 30. In the preferred embodiment, the interrupt occurs approximately 2,000 times per second or every 512 microseconds. After each interrupt, a determination is made as to whether the motor 36 is running (block 214). If it is not running, then the internal timer of the processor 30 (not shown) is reset so that the 512 microseconds may be counted by the timer to complete the interrupt period (block 216). After the timer has been reset, voltage, if any, is read across the FET 70, via the resistor 46, and its value is saved (block 218). The FET 70 is connected to the motor 36, and a current flow through the motor will exist if the FET 70 voltage is low and a motor run away condition described above has occurred. The output of the processor 30 is set to switch low (block 220) at the next interrupt and the routine returns from the interrupt (block 222).

If at block 214, it is determined that the motor 36 is running, then it is required to know whether the output has been switched to low or high during the last interrupt (block 224). If the output has been set to switch low, the processor timer is reset (block 226) and the output is set to switch high (block 228) at the next interrupt and the routine returns from the interrupt (block 230). After the elapse of 512 microseconds from the resetting of the timer in block 226, another interrupt occurs with the output at switched to low.

If at block 224, it is determined that the output has been set to switch high in the previous interrupt, then a check is made to see if the PWM output is at its maximum (block 232). If it is not, the current through the motor is measured and its value is saved (block 234). Then the timer is reset and the PWM count corresponding to the measured motor current and the desired speed setting is obtained from the look-up table (block 236). Thereafter, the output is set to switch low when the obtained PWM count expires (block 238). The routine then returns from the interrupt (block 240).

If the PWM output is at its maximum at block 232, the output pulse must stay high as long as possible to drive the motor 36 at the desired maximum speed. However, the pulse cannot stay on continuously because it would effectively become a dc voltage signal, and therefore it would be blocked by the capacitor 62 in the signal drive circuit 32. Thus, after the motor current is read and saved (block 242), the processor timer is set to switch the output pulse to go low (block 244) and the routine waits in this state until time elapses and the output in fact switches low (also block 244). The output pulse is set to switch high again after a minimal time sufficient to allow the pulse to pass through the signal drive circuit 32 has elapsed (block 246). The program remains in this state until the output in fact switches high (also block 246). After the output switches high, the timer is reset so that the processor 36 waits for the completion of the elapse of the balance of the 512 microseconds (block 248) before outputting another interrupt, and the program returns from the interrupt (block 250). In this manner, the pulse output remains high when the next interrupt occurs.

From the foregoing detailed description, it should be understood that a controller for controlling the running speed of a variable speed motor has been shown which has many advantages and desirable attributes. Of particular advantage is that the controller includes a look-up table which has the pulse width modulation (PWM) duty cycles required for operating the motor at wide range of set speeds and under wide range of motor loads. The PWM duty cycles are adapted to be obtained simply by accessing the look-up table, and therefore, there is no need for extensive algebraic calculations each time a PWM duty cycle is required. As a result, the PWM duty cycles can be obtained at faster intervals, which allows the processor to be more responsive to rapidly varying motor load conditions.

While various embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

What is claimed is:

1. A controller for controlling the running speed of a variable speed motor of the type which runs at a speed related to the duty cycle of a pulse width modulated drive voltage applied to it and to the load being applied, said controller comprising:

means for setting a motor running speed;

means for measuring a load being applied to the motor;

storage means for storing data representing a plurality of different pulse width modulation duty cycles for driving the motor at various desired motor running speeds and with various loads being applied to the motor;

processing means operatively connected to said setting means, said load measuring means and said storage means for generating signals representing a particular duty cycle corresponding to a desired running speed setting and applied load to result in said desired motor speed, said processing means generating said signals at a predetermined time interval to reach and maintain said desired motor speed;

means for applying said pulse width modulated voltage having said particular duty cycle to the motor; and,     signal driving means, operatively connected between said processing means and said applying means, for supplying said signals generated by said processing means to said applying means, and including means for stopping said signals from said processing means to said applying means in an event of a processing means failure.

2. A controller as defined in claim 1 wherein said duty cycle data is in the form of a lookup table which includes a unique output signal for each of a plurality of combinations of applied load and running speed settings.

3. The controller as defined in claim 1 wherein said setting means includes at least one switch which is activated by an operator.

4. The controller as defined in claim 1 wherein said measuring means measures a motor operating current to determine said load being applied to the motor.

5. The controller as defined in claim 1 wherein said processing means is a microprocessor.

6. The controller as defined in claim 1 wherein said applying means comprises a FET and a diode.

7. The controller as defined in claim 1 wherein said signal driving means includes amplifier means for amplifying said signals being supplied to said applying means.

8. The controller as defined in claim 1 wherein said signal stopping means comprises a transistor, a capacitor and a resistor for ac coupling said signals.

9. The controller as defined in claim 1 further including means for rectifying an ac external input voltage to a dc operating voltage.

10. The controller as defined in claim 9 further including filter means, connected to said rectifying means, for removing unwanted high frequency pulses.

11. The controller as defined in claim 9 further including regulating means for regulating and dividing said operating voltage to a first voltage for supplying to said applying means and a second voltage for supplying to said processing means.

12. The controller as defined in claim 11 wherein said regulating means comprises at least one resistor for limiting current of said rectified external input voltage, and a first zener diode for regulating said first voltage and a second zener diode for regulating said second voltage.

13. The controller as defined in claim 1 further including display means, operatively connected to said processing means, for displaying messages generated by said processing means.

14. The controller as defined in claim 13 wherein said display means is a LCD display.

15. The controller as defined in claim 14 wherein said display means displays a speed of the motor.

16. A controller for controlling the running speed of a variable speed motor of the type which runs at a speed related to the duty cycle of a pulse width modulated drive voltage applied to it and to the load being applied, said controller comprising:

means for setting a motor running speed;

means for measuring a load being applied to the motor;

storage means for storing data representing a plurality of different pulse width modulation duty cycles for driving the motor at various desired motor running speeds and with various loads being applied to the motor;

processing means operatively connected to said setting means, said load measuring means and said storage means for generating signals representing a particular duty cycle corresponding to a desired running speed setting and applied load to result in said desired motor speed, said processing means generating said signals at a predetermined time interval to reach and maintain said desired motor speed; and means for applying said pulse width modulated voltage having said particular duty cycle to the motor;

said processing means retains said desired motor speed for a predetermined period after an input power to the controller is terminated, and resets said desired motor speed when said input power is reapplied to the controller.

17. A controller for controlling the running speed of a variable speed motor of the type which runs at a speed related to the duty cycle of a pulse width modulated drive voltage applied to it and to the load being applied, said controller comprising:

means for setting a motor running speed;

means for measuring a load being applied to the motor;

storage means for storing data representing a plurality of different pulse width modulation duty cycles for driving the motor at various desired motor running speeds and with various loads being applied to the motor;

processing means operatively connected to said setting means, said load measuring means and said storage means for generating signals representing a particular duty cycle corresponding to a desired running speed setting and applied load to result in said desired motor speed, said processing means generating said signals at a predetermined time interval to reach and maintain said desired motor speed;

said processing means reducing said voltage applied to the motor by said applying means when the motor approaches an overload condition and stopping said voltage when the motor reaches said overload condition; and means for applying said pulse width modulated voltage having said particular duty cycle to the motor.

18. A controller for controlling the running speed of a variable speed motor of the type which runs at a speed related to the duty cycle of a pulse width modulated drive voltage applied to it and to the load being applied, said controller comprising:

means for setting a motor running speed;

means for measuring a load being applied to the motor;

storage means for storing data representing a plurality of different pulse width modulation duty cycles for driving the motor at various desired motor running speeds and with various loads being applied to the motor;

processing means operatively connected to said setting means, said load measuring means and said storage means for generating signals representing a particular duty cycle corresponding to a desired running speed setting and applied load to result in said desired motor speed, said processing means generating said signals at a predetermined time interval to reach and maintain said desired motor speed;

means for applying said pulse width modulated voltage having said particular duty cycle to the motor; and, power shorting means, operatively connected to said processing means, for shorting the controller operating voltage when said applying means fails.

19. The controller as defined in claim 18 wherein said power shorting means comprises a SCR.

* * * * *